United States Patent [19]

Wright

[11] Patent Number: 5,809,083

[45] Date of Patent: Sep. 15, 1998

[54] DIFFERENTIALLY ENCODED PILOT WORD SYSTEM AND METHOD FOR WIRELESS TRANSMISSIONS OF DIGITAL DATA

[75] Inventor: Andrew S. Wright, Vancouver, Canada

[73] Assignee: AT&T Wireless Services, Inc., Middletown, N.J.

[21] Appl. No.: 344,238

[22] Filed: Nov. 23, 1994

[51] Int. Cl.[6] .................................................. H04B 15/00
[52] U.S. Cl. .......................... 375/285; 375/254; 375/296; 375/346; 375/365; 370/500; 455/63
[58] Field of Search ..................................... 375/322, 298, 375/266, 267, 285, 365, 366, 368, 254, 346, 324, 261, 316, 296, 226; 455/65, 67.4, 63; 370/500; 379/343

[56] References Cited

U.S. PATENT DOCUMENTS

| | | |
|---|---|---|
| 3,633,107 | 1/1972 | Brady . |
| 4,494,239 | 1/1985 | Martin . |
| 4,675,880 | 6/1987 | Davarian . |
| 4,953,183 | 8/1990 | Bergmans et al. . |
| 5,048,057 | 9/1991 | Saleh et al. ............................... 375/267 |
| 5,056,105 | 10/1991 | Darmon et al. . |
| 5,140,615 | 8/1992 | Jasper et al. . |
| 5,170,413 | 12/1992 | Hess et al. ............................... 375/267 |
| 5,187,806 | 2/1993 | Johnson et al. ........................... 455/15 |
| 5,241,544 | 8/1993 | Jasper et al. . |
| 5,406,585 | 4/1995 | Rohani et al. . |
| 5,519,730 | 5/1996 | Jasper et al. ............................. 375/260 |
| 5,666,378 | 9/1997 | Marchetto et al. ...................... 375/222 |
| 5,712,877 | 1/1998 | Ho et al. ................................. 375/284 |

OTHER PUBLICATIONS

Journal of the Institution of Electronic and Radio Engineers, Nov.–Dec. 1987, UK, vol. 57, No. 6, suppl., ISSN 0267–1689, Rashidzadeh B., et al.

Patent Abstracts of Japan, vol. 010 No. 024 (E–377), 30 Jan. 1986 & JP, A, 60 183837 (Nippon Denki) 19 Sep. 1985.

IEEE Transactions on Vehicular Technology, Aug. 1993, USA, vol. 42, No. 3, ISSN 0018–9545, pp. 294–301, Sunaga T., et al.

WO,A,93 09622 (Motorola, Inc.) 13 May 1993.

International Conference on Communications –ICC '91, Denver, Jun. 23–26, 1991, vol. 3 of 3, pp. 1495, XP 000277570, Dileeka Subasinghe–Dias.

*Primary Examiner*—Wellington Chin
*Assistant Examiner*—Jean B Corrielus

[57] ABSTRACT

A system and method for transmitting digital data over a wireless channel uses periodically-transmitted, differentially encoded pilot words to allow a receiver to rapidly synchronize with a transmitter. Each differentially encoded pilot word comprises at least two pilot symbols that are separated by a fixed difference. The receiver monitors differences between symbols to locate the differentially encoded pilot words, and to thereby become synchronized with the transmitter. Once the receiver becomes synchronized with the transmitter, the receiver uses the pilot symbols of the differentially encoded pilot words to perform channel estimation and compensation.

25 Claims, 6 Drawing Sheets

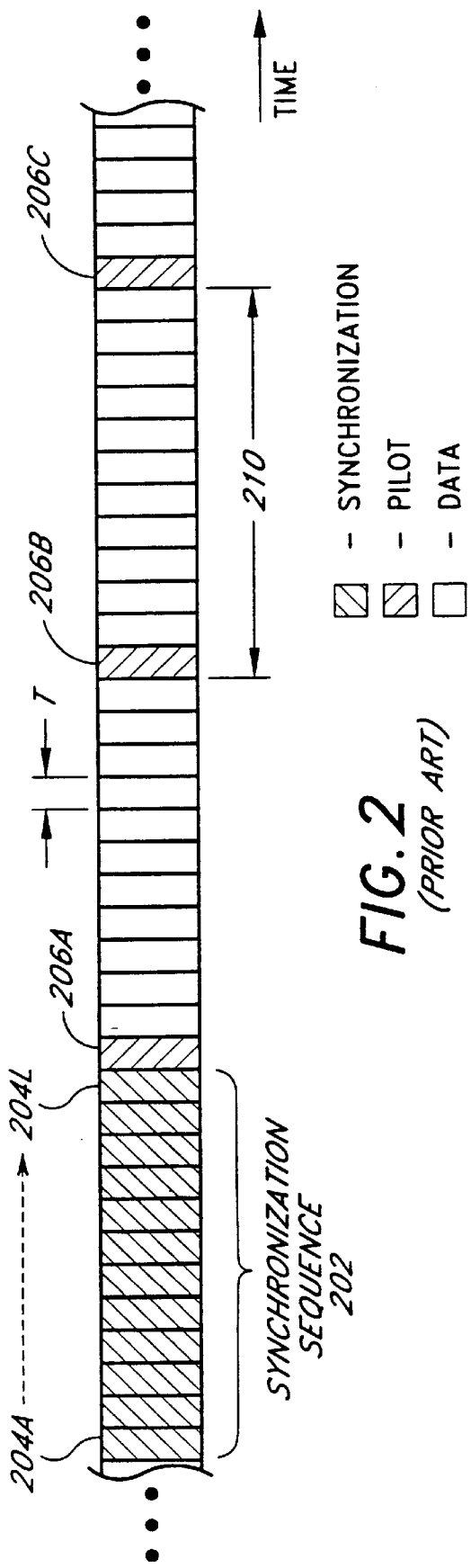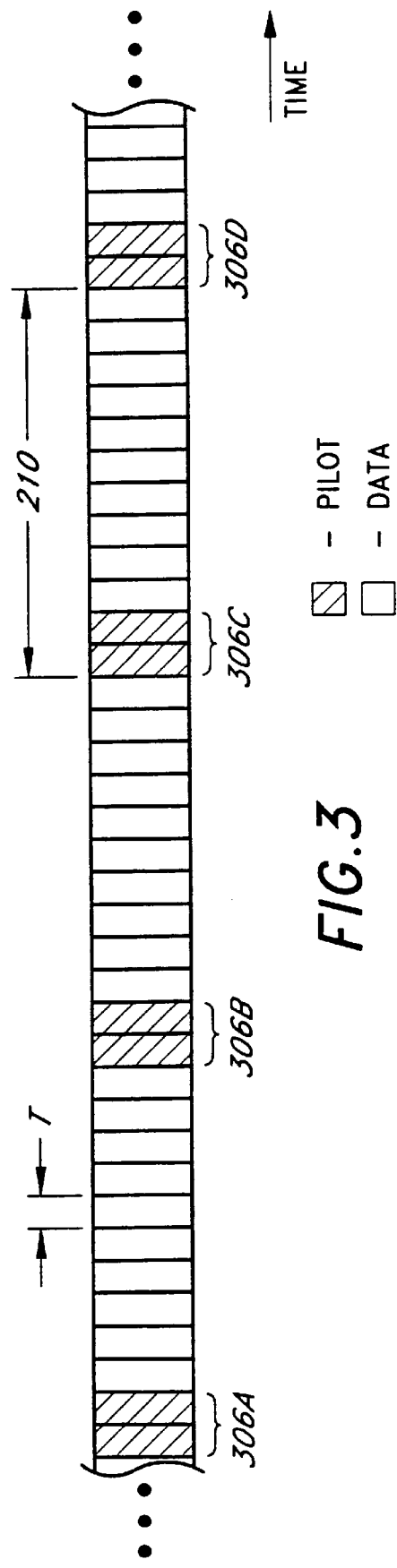

DIFFERENTIALLY ENCODED PILOT WORD SYSTEM AND METHOD FOR WIRELESS TRANSMISSIONS OF DIGITAL DATA

FIELD OF THE INVENTION

This invention relates to wireless digital communications. In particular, this invention relates to wireless communications systems that use pilot symbols to estimate the state of a channel.

BACKGROUND OF THE INVENTION

Various modulation techniques exist for varying the phase and/or amplitude of a carrier to convey digital data from a transmitter to a receiver. Examples of such modulation techniques include phase shift keying (PSK) and quadrature amplitude modulation (QAM). PSK involves the switching of the phase of the carrier between a plurality of discrete phase offsets (relative to a reference carrier phase), with each discrete phase offset representing one or more information bits. QAM involves the switching of both the phase and amplitude of the carrier, with each discrete combination of carrier amplitude and phase representing one or more information bits.

Every signaling interval, the transmitter transmits one of a plurality of possible "symbols," with each symbol being a signal (at the carrier frequency) that has a certain phase and amplitude. Each symbol (i.e., each unique amplitude-phase combination) represents one or more bits of information in accordance with a given modulation technique. With 8-PSK, for example, one of eight possible symbols is transmitted every signaling interval, with each symbol having a unique phase (and fixed amplitude) that corresponds to a three bit value (since $2^3=8$). Illustratively, phase offsets of 0, 45, 90, 135, 180, 225, 270 and 315 degrees may represent binary values of $000_2$, $001_2$, $010_2$, $011_2$, $100_2$, $101_2$, $110_2$, and $111_2$ respectively. Similarly, with 16 QAM, each of 16 symbols has a unique phase-amplitude combination that represents a unique four bit value.

The symbols for a given modulation scheme can be conveniently represented as a set of complex values, with the imaginary portion of each complex value representing the phase offset and the magnitude of the complex value representing the amplitude. The plot of the complex symbol values in a complex plane for a modulation scheme is commonly referred to as the "symbol constellation" for the modulation scheme. (See, for example, FIG. 1, which illustrates a conventional 16 QAM symbol constellation).

In wireless communications systems, the information signal is transmitted to the receiver over a channel that comprises multiple propagation paths or "multipaths" between the transmitter and the receiver. These multipaths are caused by the reflection of the transmitted signal off hills, buildings, airplanes, discontinuities in the atmosphere, and the like. As the result of multipaths, the signal received by the receiver consists of multiple components that vary in both phase and amplitude.

The complex addition of these multiple components at the receiver results in a phenomenon known as fading, wherein the phase and amplitude of the received signal varies with time. Thus, at any given time, the state of the channel between the transmitter and the receiver can be described generally by the amplitude attenuation and phase shift caused by the channel. These channel characteristics can significantly affect the ability of a wireless receiver to determine the phase and amplitude of the transmitted signal, and can thus impair the ability of the receiver to decode the transmitted symbols. This impairment is particularly significant when the receiver encounters "deep fades," which are periods of significant signal attenuation caused by the destructive addition of multipath components.

Various techniques have been developed to combat the effects of fading. One technique involves the periodic insertion by the transmitter of predetermined symbols known as "pilot symbols" into the stream of data symbols to allow the receiver to estimate the state of the channel. The receiver knows when the pilot symbols will be transmitted, and further knows the value (i.e., the phase and amplitude) of pilot symbols upon transmission. Thus, upon receipt of a pilot symbol, the receiver can determine the extent to which the channel is currently impairing the phase and amplitude of the transmitted signal by comparing the value of the received pilot symbol with the expected (i.e., transmitted) value.

Once the receiver estimates the current phase and amplitude effects of the channel, the receiver compensates for these effects by appropriately adjusting the phase and amplitude of the received signal. Channel estimates are updated each time a pilot symbol is received by the receiver. Since the channel state is generally quasi-static over small numbers of consecutive symbols, the method works well provided that pilot symbols are inserted at a rate that is commensurate with the rate at which the channel state varies. The rate at which the channel state varies depends on a variety of factors, including the relative speed between the transmitter and receiver (if any).

Before a receiver can extract pilot symbols from the symbol stream and estimate the channel state, the receiver must become synchronized with the transmitter so that it knows when the pilot symbols will be transmitted. Since pilot symbols are affected and often corrupted by the channel, the process of synchronizing on the periodic pilot symbols is typically prohibitively slow. Pilot symbol synchronization is further complicated by the fact that the pilot symbols are symbols that may also appear in the stream of data symbols.

To solve this problem, conventional transmitters periodically transmit a separate synchronization sequence of known symbols (e.g., 20 consecutive symbols) to permit the receiver to synchronize with the transmitter. The use of a synchronization sequence, however, occupies bandwidth that could otherwise be used for the transmission of data symbols. Further, a receiver of such a system must wait for the transmission of a synchronization sequence before it can extract pilot symbols and perform channel estimation.

SUMMARY

The present invention solves these problems using a data stream format that includes periodically-inserted, differentially encoded pilot words. The differentially encoded pilot words permit receivers to synchronize with the transmitter, obviating the need for a synchronization sequence. In a preferred embodiment of a wireless communications system, each differentially encoded pilot word consists of two consecutively-transmitted pilot symbols that are a fixed difference (or "pilot difference") apart, with the pilot difference being the same for each differentially encoded pilot word. The pilot difference may alternatively be varied, provided that the sequence of pilot words is known to the receiver so that the receiver can use pilot words for performing channel estimation. In other embodiments, each pilot word comprises three or more differentially encoded pilot symbols, with each pilot symbol of a pilot word being a fixed difference from another pilot symbol of the pilot word. Pilot differences used to encode differentially encoded pilot words preferably include differences in phase, but may include differences in phase and/or differences in amplitude.

Receivers of the system monitor differences between consecutively-received (and channel impaired) symbols in order to detect the periodic, differentially encoded pilot words. Differences (or "difference values") between consecutively-transmitted symbols tend to be robust when transmitted over a wireless channel in comparison to the symbols themselves, since channel impairments to such difference values are typically small in comparison to the impairments to the symbol values. Differential encoding of pilot words thus enables receivers of the system to locate the periodically transmitted differentially encoded pilot words. Detection of the differentially encoded pilot words permits the receivers to become synchronized with the transmitter, as is necessary to receive meaningful data and thereby become synchronized with the transmitter.

The pilot symbols of the differentially encoded pilot words are predetermined symbols that are known to receivers of the system. Once a receiver determines the periodic location of the differentially encoded pilot words within the symbol stream, the receiver extracts the channel-impaired pilot symbols from the symbol stream and compares the channel-impaired pilot symbols to their known or "expected" values. The receiver thereby generates estimates of the current state of the channel. These channel estimates then are used by the receiver to compensate the channel-impaired data symbols it receives (in phase and amplitude) on a symbol-by-symbol basis.

In accordance with one aspect of the present invention, there is thus provided a transmitter for transmitting data over a wireless channel, wherein the transmitter comprises a constellation mapper, a differentially encoded pilot word generator, a pilot word inserter, a filter, and a radio frequency (RF) up converter. The constellation mapper receives a data stream and generates a data symbol stream by transforming binary values of the data stream into corresponding symbols in accordance with a particular, coherent modulation technique. The differentially encoded pilot word generator generates differentially encoded pilot words, with each differentially encoded pilot word comprising at least two pilot symbols. The pilot word inserter periodically inserts the differentially encoded pilot words into the data symbol stream to produce a composite symbol stream. The filter filters the composite symbol stream prior to transmission, and the RF up-converter generates an RF representation of the composite symbol stream for transmission over the wireless channel.

BRIEF DESCRIPTION OF THE DRAWINGS

FIG. 2 illustrates an example sequence of transmitted symbols in accordance with the prior art.

FIG. 3 illustrates a sequence of transmitted symbols in accordance with the present invention.

DETAILED DESCRIPTION OF THE PREFERRED EMBODIMENTS

Figure 1:
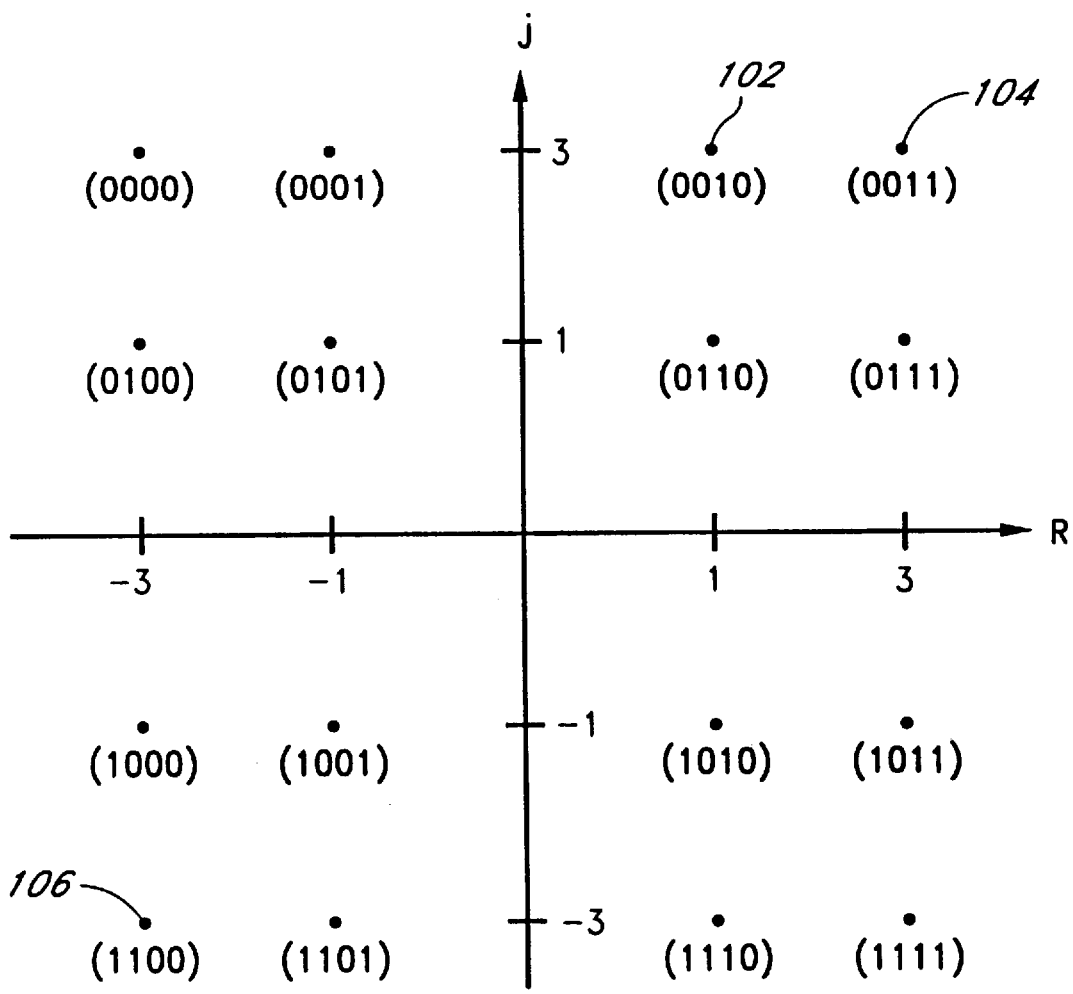
FIG. 1 illustrates a conventional 16 QAM symbol constellation.

The prior art is further described with reference to FIGS. 1 and 2. FIG. 1 illustrates a conventional 16 QAM symbol constellation. Each symbol is shown as a complex point in a Cartesian coordinate system that has a real (R) axis and an imaginary (j) axis. Each of the 16 symbols corresponds to the unique 4 bit binary value shown in parenthesis below the symbol. For example, the symbol 102 in FIG. 1 corresponds to the value $0010_2$. To convey digital data to a receiver, a transmitter groups output data bits into nibbles (four bits), and maps each nibble to the corresponding symbol. One or more of the 16 symbols may additionally be used as a pilot symbol, and/or may be used as a synchronization symbol.

As used herein, the term "symbol" refers generally to the RF signals of discrete phases and/or amplitudes that are used to convey data in accordance with a given modulation technique. However, since such amplitude and phase information can be represented or conveyed in a variety of forms (e.g., as complex numbers, points on a complex plane, analog or digital pulse signals that represent complex values, etc.), the term will also be used herein to include the various forms by which the amplitude/phase information may be represented or conveyed. Where applicable, the term "complex value" or "complex symbol value" will be used to emphasize that numerical data is being operated on or conveyed.

The 16 QAM constellation shown in FIG. 1 will be used herein to describe the prior art and an illustrative embodiment of the present invention. However, as will be recognized by those skilled in the art, the present invention is fully applicable to other coherent modulation techniques that use different symbol constellations.

FIG. 2 shows an illustrative symbol stream for a conventional wireless digital communications system that transfers one symbol every signaling interval T. The symbol sequence is representative of packet radio or wireless modem system for which multiple receivers monitor an information signal that is transmitted continuously from a single transmitter. Referring to FIG. 2, a synchronization sequence 202 comprises synchronization symbols 204A–204L. The synchronization sequence is transmitted on a periodic basis to permit the receiver or receivers of the system to synchronize with the transmitter using techniques that are well known in the art. Conventional synchronization sequences typically comprise at least 11 symbols, which may be provided consecutively in the symbol stream (as shown in FIG. 2), or may be interleaved with symbols that carry data, control information, pilot information and other types of information.

The synchronization sequence 202 is followed by a stream of data symbols with periodically-inserted pilot symbols 206A, 206B, 206C. Each pilot symbol is the same symbol (i.e., each pilot symbol 206A, 206B, 206C has the same amplitude and phase), and the symbol used as the pilot symbol is known to the receiver. Illustratively, the symbol 3+j3 (symbol 104 in FIG. 1) may be used as the pilot symbol, in which case the receiver will "expect" to receive a symbol of 3+j3 during each pilot symbol signalling interval.

A pilot symbol is inserted into the stream of data symbols every pilot period 210. The pilot period 210 for the sequence shown in FIG. 2 is equal to 12T (twelve signaling intervals), resulting in the transmission of one pilot symbol for every eleven data symbols. The pilot period 210 generally must be selected to be commensurate with the expected rate of change of the channel for the particular application. For mobile applications, factors that are considered in selecting an appropriate pilot period 210 include the maximum expected velocity between transmitters and receivers of the system, the transmission frequency, and the baud rate for the system. By way of example, for a cellular phone system having a frequency of operation of 910 MHz (or wavelength of 1.08 feet) and a maximum expected vehicular velocity of 60 miles per hour (88 feet per second), the maximum Doppler shift will be $2\times(velocity)/\lambda=(2)(88)/(1.08)=163$ Hz. From Nyquist's sampling theorem, the bandlimited channel variation should be sampled at a rate of at least twice the maximum Doppler shift, or 326 Hz, requiring a pilot period of $1/326=3.1$ milliseconds. In practice, to ensure accurate channel reconstruction, pilot symbols may be inserted at twice this rate, or every 1.55 milliseconds. The number of symbols falling between the inserted pilot symbols will then depend upon the baud rate of the system and the modulation technique (8 PSK, 16 QAM, 64 QAM, etc.) employed. A detailed description of the characteristics of mobile RF channels can be found in William C. Jakes, Jr., Microwave Mobile Communications, (New York: John Wiley and Sons, 1974).

In operation, when a receiver of a typical wireless system is first turned on, the receiver monitors the stream of symbols received and attempts to locate a synchronization sequence. The receiver cannot extract pilot symbols or receive meaningful data during this time period. Thus, even if the receiver could become synchronized with the transmitter on the first synchronization sequence it receives, it would still have to wait for the transmission of this synchronization sequence before it could extract pilot symbols or receive meaningful data.

Once the receiver locates a synchronization sequence and becomes synchronized with the transmitter, the receiver begins to extract the transmitted pilot symbols and estimate the state of the channel. Depending upon the nature of the particular system (for example, packet radio, wireless modem/fax, cellular phone, beeper, or PDA), the receiver may begin to passively receive data, or may transmit a signal to inform the transmitter that is has become synchronized.

FIG. 3 illustrates a symbol stream in accordance with the present invention. The periodic pilot symbols 206A–206C of FIG. 2 are replaced with differentially encoded pilot words 306A–306D (also referred to herein as "pilot words 306A–306D"). Advantageously, each differentially encoded pilot word comprises two or more pilot symbols, wherein the pilot symbols are separated by (or "encoded with") a fixed difference (i.e., a fixed difference in amplitude and/or phase). Illustratively in FIG. 3, each pilot word 306A–306D comprises two consecutive pilot symbols that are a fixed difference apart. Referring to FIG. 1, for example, each pilot word 306A–306D may consist of the symbol 104 (3+j3) followed by the symbol 106 (−3−j3), thus having a phase difference of 180 degrees and an amplitude difference of zero. Each pilot word 306A–306D could alternatively comprise three pilot symbols, with the first and second pilot symbols separated by a first fixed difference and the second and third pilot symbols separated by a second fixed difference. Regardless of the number of pilot symbols per differentially encoded pilot word, each pilot word is encoded with the same difference (or differences). Preferably, each pilot word consists of the same sequence of pilot symbols. As will be recognized, although differentially encoded pilot words are described herein as comprising multiple "pilot symbols," it is not necessary that all pilot symbols of a differentially encoded pilot word be used for channel estimation.

For radio channels that are quasi-static on a symbol-by-symbol basis, the effect of the channel on the encoded difference is negligible. For example, if the differentially encoded pilot word 3+j3, −3−j3 is transmitted at a time when the channel is approximated by an amplitude attenuation of 50% and a phase offset of 30 degrees, the phase and amplitude differences between the consecutive pilot symbols will still be approximately 180 degrees and zero respectively. Since the encoded differences are not significantly affected by the channel, the differentially encoded pilot words in the symbol stream can be detected by monitoring the differences between symbols (using a correlator or COMB filter, as described below). This eliminates the need for a separate pilot synchronization sequence.

As illustrated by FIG. 3, the present invention requires the insertion of an additional pilot symbol every pilot period 210. However, the bandwidth occupied by the added pilot symbols is generally less than the bandwidth occupied by the prior art pilot synchronization sequence 210. Thus, an overall bandwidth reduction is achieved. Further, since the use of differentially encoded pilot words enables receivers to become synchronized with the transmitter without waiting for the transmission of a pilot synchronization sequence, a reduction in the average synchronization time is typically achieved.

In general, phase differences between consecutive symbols tend to be less susceptible to channel impairments than the amplitude differences between the symbols. Thus, pilot words may be differentially encoded with fixed phase differences only, in which case the receiver may ignore (or give less weight to) differences in amplitude when attempting to synchronize with the transmitter. However, for variable amplitude systems (for example, QAM) it may be desirable to additionally or alternatively encode pilot words with differences in amplitude. Thus, as used herein, the term "difference" refers to the complex difference between two symbols, and thus encompasses differences in phase and differences in amplitude. The term "pilot difference" refers to the difference that is used to encode two pilot symbols of a differentially encoded pilot word.

The pilot symbols of the differentially encoded pilots words 306A–306D are shown in FIG. 3 as being transmitted in consecutive symbol positions. It will be recognized, however, that the two pilot symbols of each pilot word 306A–306D could alternatively be transmitted in non-consecutive symbol positions provided that the wireless channel remains quasi-static during the time period between the respective pilot symbol transmissions (with the pilot symbols transmitted in the same symbol positions each pilot period so that the receiver can extract the pilot symbols). Illustratively, the two pilot symbols of each pilot word 306A–306D could be separated by a single data symbol, provided that the channel is expected to remain quasi-static for 2T (two signaling intervals).

Figure 4:
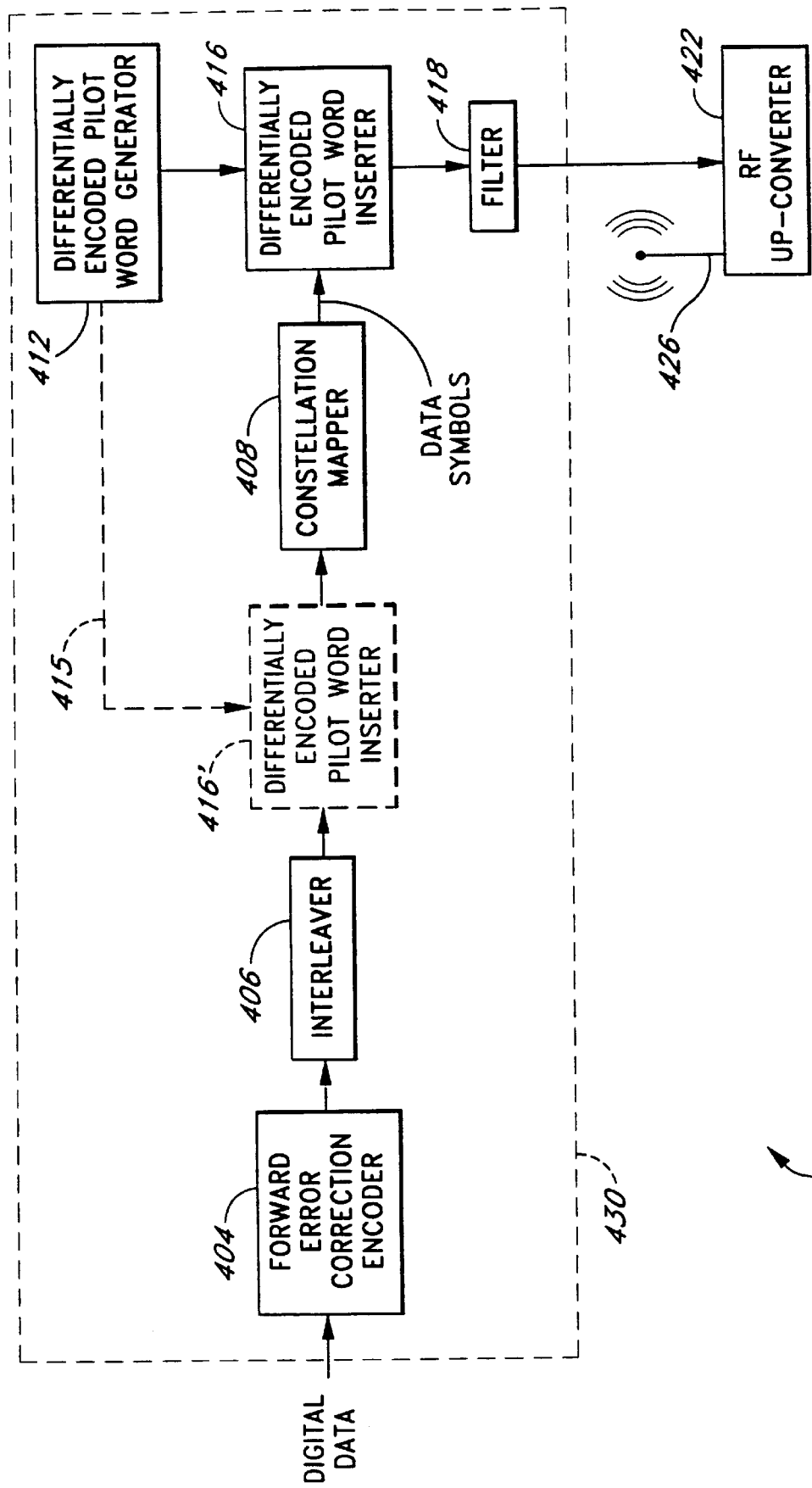
FIG. 4 is a functional block diagram of a transmitter in accordance with the present invention.

FIG. 4 is a functional block diagram of a preferred embodiment of a transmitter 400 in accordance with the present invention. The transmitter 400 comprises a forward error correction encoder 404, an interleaver 406, a constellation mapper 408, a differentially encoded pilot word generator 412, a differentially encoded pilot word inserter (denoted by reference numbers 416 and 416' to indicate two alternative locations), a filter 418, a radio frequency (RF) up-converter 422, and an antenna 426. As will be recognized by those skilled in the art, the functional blocks shown within the box 430 can be implemented in a straight forward manner using one or more digital signal processing (DSP) chips, such as the C50 DSP chip available from Texas Instruments, Inc., under the control of software. Preferably, however, the functional blocks are implemented using dedicated digital circuitry integrated into an application-specific integrated circuit (ASIC). It will also be recognized that the forward error correction encoder 404 and the interleaver 406 are not necessary components of a transmitter in accordance with the present invention, and can thus be omitted if desired.

Referring to FIG. 4, the forward error correction encoder 404 receives a digital data stream and adds redundancy bits in accordance with techniques that are well known in the art. The digital data stream may represent voice, video or data (or a combination thereof), and may come from any of a variety of possible sources. Illustratively, the digital data stream may be the output of a data link layer of a node of an open systems interface (OSI) computer network. The forward error correction encoder 404 encodes the digital data stream using convolutional coding, trellis coding, Reed-Solomon coding, and/or any other well known type of encoding technique suitable for the wireless transmission of digital data.

The output of the forward error correction encoder 404 is fed to a conventional interleaver 406. The interleaver performs convolutional interleaving or block interleaving in accordance with techniques that are well known in the art. Regardless of the type of interleaving employed, the primary function of the interleaver 406 is to rearrange the data stream in order to mitigate the effects of burst errors. Illustratively, the interleaver 406 interleaves each block of data (for example, 64 bits) with preceding and following blocks of data in the digital data stream so that each block of data is transmitted over a greater period of time, with this period of time exceeding the expected average duration of deep fades. Burst errors caused by deep fades are then spread out over multiple blocks of data in a manner that enables the receiver to correct the errors (using forward error correction, CRC, etc.) once the data stream has been de-interleaved.

The output of the interleaver 406 is fed to a conventional constellation mapper 408. The constellation mapper 408 maps groups of data bits (for example, four consecutive bits) into symbols in accordance with any linear, coherent modulation technique. Illustratively, the constellation mapper may map data bits into symbols according to the 16 QAM symbol constellation shown in FIG. 1. The mapping function can be performed, for example, using a lookup table stored in read-only memory (ROM).

The constellation mapper 408 outputs digital signals that represent the data symbols to be transmitted. These digital signals are preferably in the form of variable-amplitude pulses that represent the real and imaginary portions of the symbols. For each generated symbol the constellation mapper 408 generates one pulse that represents the real component of the symbol (referred to as the in-phase pulse or "I pulse"), and a second pulse that represents the imaginary portion of the symbol (referred to as the quadrature pulse or "Q pulse"), with the real and imaginary symbol components specified by the amplitudes of the respective pulses. Illustratively for the symbol 102 in FIG. 1, the constellation mapper 408 would generate an I pulse of amplitude +1 to represent the real component of the symbol 102, and a Q pulse of amplitude +3 to represent the imaginary component of the symbol. Each I–Q pulse pair represents a complex value that corresponds to the carrier amplitude and phase to be transmitted. The I and Q pulses may be provided on separate I and Q channels, and are ultimately used to control the amplitude and phase of the carrier. The I and Q channels are represented in FIG. 4 by the arrow that connects the constellation mapper 408 to the differentially encoded pilot word inserter 416.

The output of the constellation mapper 408 is fed to the differentially encoded pilot word inserter 416 (hereinafter "pilot word inserter"), which periodically inserts differentially encoded pilot words. A differentially encoded pilot word generator 412 generates the differentially encoded pilot words, and provides the differentially encoded pilot words to the pilot word inserter 416 for insertion into the symbol stream. The pilot symbols of the differentially encoded pilot words are preferably inserted in consecutive symbol positions, but could be separated by one or more data symbols. The pilot symbols that form the differentially encoded pilot words are preferably inserted as digital I and Q pulses that represent the real and imaginary components of the pilot symbols.

In an alternative embodiment, illustrated by dashed lines in FIG. 4, the differentially encoded pilot word generator 412 and pilot word inserter 416' are alternatively provided upstream from the constellation mapper 408 (after the interleaver 406), and the pilot word inserter 416' periodically inserts digital values (generated by the differentially encoded pilot word generator 412) that correspond to the differentially encoded pilot words. The constellation mapper 408 then generates the pilot symbols of the differentially encoded pilot words. Illustratively for a pilot word consisting of the consecutive symbols 104 and 106 in FIG. 1, the pilot word inserter 416' would insert the binary values $0011_2$ and $1100_2$ into the data stream.

The output of the pilot word inserter 416 is provided to a conventional filter 418. This output is preferably in the form of separate I and Q signals, with each signal comprising sequences of concatenated pulses of varying amplitude. The filter 418 bandlimits these signals, and thus smooths the instantaneous transitions between consecutive pulses. The filter 418 thereby smooths the instantaneous transitions in carrier amplitude and phase that result from transitions between consecutive non-like symbols. Such filtering is generally necessary for effective wireless transmissions of digital data, as is well understood in the art.

The filter 418 is preferably a conventional square-root-raised cosine filter, and is preferably implemented as a digital filter. The output of the digital filter is fed to a digital-to-analog converter (not shown) that converts each digital signal into its analog equivalent. In an alternative embodiment, the digital-to-analog filter is provided upstream from the filter 418, and the filter 418 is an analog filter that processes analog I and Q signals.

The output of the filter 418 is provided to the RF up-converter 422 that converts the baseband, filtered pulse signals into an RF signal at a carrier frequency, with the amplitudes of the filtered I and Q pulse signals controlling the amplitude and phase of the RF signal. In the preferred embodiment, the baseband signal is up-converted to a 900 MHz Rf signal. The RF signal is then radiated from the antenna 426.

Figure 5:
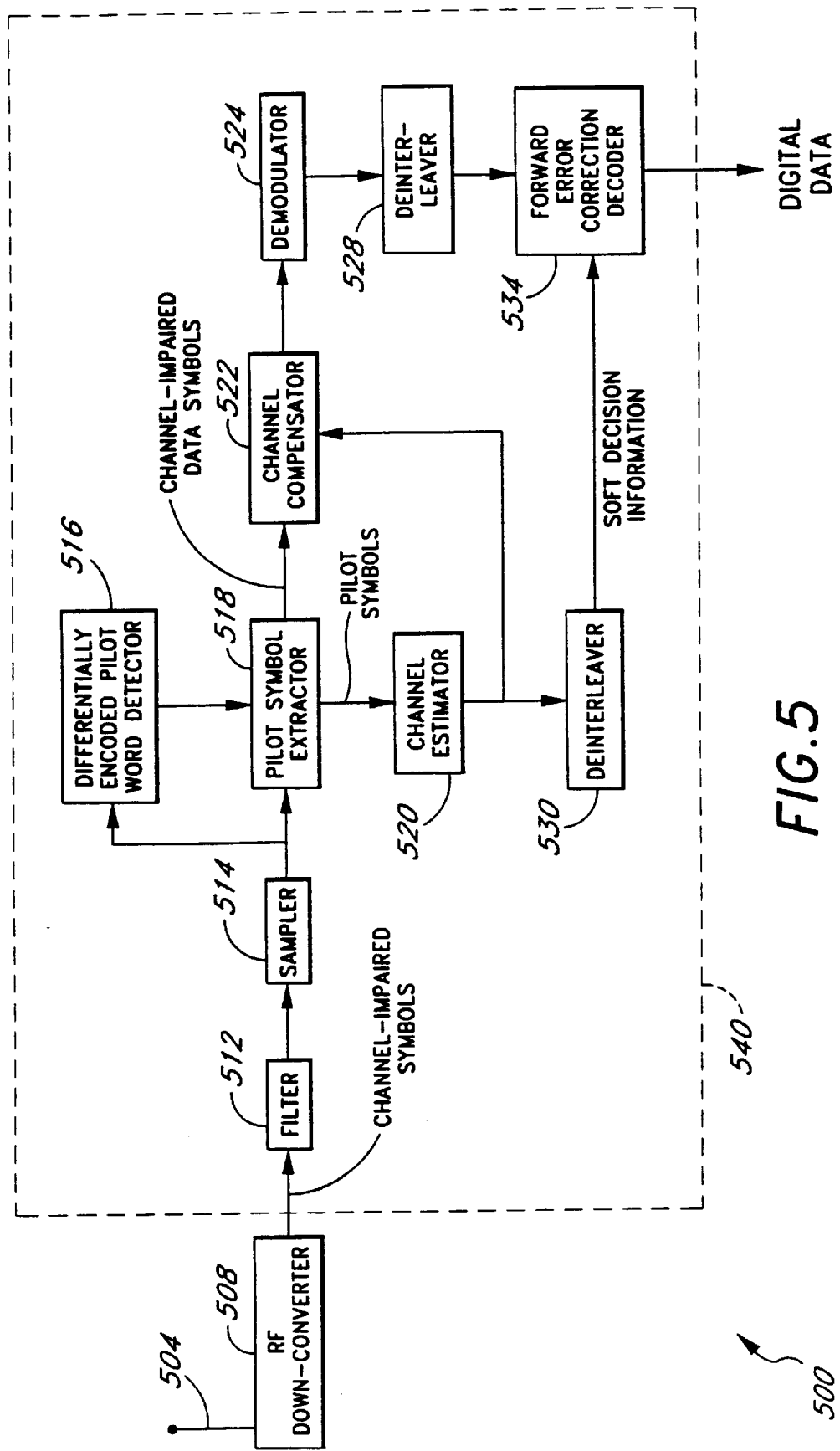
FIG. 5 is a functional block diagram of a receiver in accordance with the present invention.

FIG. 5 is a functional block diagram of a receiver 500 in accordance with the present invention. The receiver 500 corresponds to the transmitter 400 of FIG. 4. The receiver 500 comprises an antenna 504, an RF down-converter 508, a filter 512, a sampler 514, a differentially encoded pilot word detector 516, a pilot symbol extractor 518, a channel estimator 520, a channel compensator 522, a demodulator 524, deinterleavers 528 and 530, and a forward error correction decoder 534. The deinterleavers 528 and 530 and the forward error correction decoder 534 are optional components that may be omitted if no interleaving or forward error correction encoding is performed by the transmitter 400. The functional blocks shown in the box 540 can be implemented using one or more general purpose DSP chips (such as the Texas Instruments C50), but are preferably implemented using dedicated digital hardware integrated into an ASIC. The filter 512 can alternatively be implemented as an analog filter using analog components.

Referring to FIG. 5, the RF signal received by the antenna 504 is converted to a baseband signal by a conventional RF down-converter 508. The RF down-converter 508 preferably outputs separate I and Q signals that represent the in-phase (real) and quadrature (imaginary) components of the received signal respectively. These I and Q signals represent the transmitted symbols as affected or impaired by the wireless channel.

The output of the RF down-converter is fed to the filter 512. The filter 512 bandlimits the baseband signal so that symbol-to-binary value conversion is limited to the bandwidth of the transmitted signal. The filter 512 is thus preferably identical in frequency response to the filter 418 used with the transmitter 400. As in conventional in the art, square-root-raised cosine filters can be used for the transmitter and receiver filters 418 and 512, resulting in an overall root-raised cosine filtering technique that produces a low degree of intersymbol interference. The filter 512 outputs I and Q signals that are in the form of variable-amplitude pulses, with transitions between pulses smoothed by the filtering process.

The output of the filter 512 is fed to the sampler 514. Each signaling interval T the sampler 514 samples the filtered I and Q signals to produce a single complex value that represents a channel-impaired symbol. As is well known in the art, the above-mentioned root-raised cosine filtering technique advantageously produces output I and Q pulses that, at a specific, known instant in time, have the same amplitudes as the corresponding unfiltered I and Q pulses (ignoring channel effects). The sampler 514 samples the I and Q signals at this point in time (during each signaling interval T) so that the amplitude effects of the filtering process on the I and Q signals are effectively negated.

The output of the sampler 514 is fed to the differentially encoded pilot word detector 516 (hereinafter "pilot word detector 516"), and is also fed to the pilot symbol extractor 518. The pilot word detector 516 detects the periodic position of differentially encoded pilot words within the symbol stream by repetitively calculating the difference between received symbols (i.e., the difference between the complex values that represent channel-impaired symbols), and by effectively searching for the periodic occurrence of the pilot difference within the calculated stream of difference values. If pilot symbols of pilot words are inserted by the transmitter 400 in consecutive symbol positions (as in FIG. 3), the pilot word detector 516 monitors the difference between consecutive symbols. The process of searching for differentially encoded pilot words is normally performed when the receiver 500 is initially placed in a receive mode, or when the receiver 500 otherwise attempts to become synchronized with the transmitter 400.

To distinguish the differentially encoded pilot words in the symbol stream from groups of data symbols that are coincidentally separated by the same difference, the pilot word detector 516 monitors the symbol stream over multiple pilot periods 210 (FIG. 3) before determining the periodic position of the pilot words. In the preferred embodiment, the pilot word detector 516 analyzes the symbol stream over 32 pilot periods before determining the periodic position of the pilot words.

Once the pilot words have been detected, the pilot word detector 516 informs the pilot symbol extractor 518 of the periodic location of the pilot words. The pilot symbol extractor 518 then periodically samples the symbol stream at the proper times to extract the pilot symbols of the differentially encoded pilot words. The extracted pilot symbols are provided to the channel estimator 520. The remaining symbols in the symbol stream are fed to the channel compensator 522. These remaining symbols are in the form of complex values that represent channel-impaired data symbols.

The channel estimator 520 compares the amplitudes and phases of the extracted pilot symbols with the expected amplitudes and phases, to thereby estimate the effects of the channel on the transmitted signal. The channel estimator 520 preferably performs the comparison with each pilot symbol of a differentially encoded pilot word, and then uses the results of each comparison to calculate the average attenuation and average phase impairment as the estimate. The estimate is recalculated every time a pilot word is received (i.e., every pilot period 210). Estimates obtained over multiple pilot periods 210 are then interpolated or otherwise filtered to generate symbol-specific amplitude and phase adjustments to apply to the channel-impaired data symbols. The channel estimator 520 outputs these symbol-by-symbol phase and amplitude estimates to the channel compensator 522 and the deinterleaver 530.

The channel compensator 522 uses the output of the channel estimator 520 to adjust or correct the amplitudes and phases of channel-impaired data symbols. Each channel-impaired data symbol is compensated by adjusting the real and imaginary portions of the complex value that represents the channel-impaired data symbol, using a channel estimate that was calculated for that data symbol. Compensated data symbols are fed to the demodulator 524, which converts the compensated data symbols to their corresponding binary values (for example, the four bit values shown in FIG. 1) in accordance with the specific modulation technique used by the transmitter 400. The demodulator 524 performs this function by matching or assigning the compensated data symbols received from the channel compensator 522 with the constellation symbols to which the compensated data symbols most closely correspond in value. Assuming that the data stream was interleaved by the transmitter 400, the output of the demodulator 524 is fed to the deinterleaver 528 to return the binary values of the data stream to the original (preinterleaved) sequential order.

If forward error correction encoding was performed by the transmitter 400, the deinterleaved data is fed to the forward error correction decoder 534 to correct for errors. As is conventional in the art, the forward error correction decoder 534 makes use of soft decision information generated by the channel estimator 520 to improve the reliability of the error correction process. The soft decision information is in the form of the symbol-by-symbol channel estimates generated by the channel estimator 520, with the estimates deinterleaved by the deinterleaver 530 so that the estimates are in a sequential order that corresponds with the data stream. These estimates are an indication of the reliability of the binary values generated by the demodulator 524.

To further improve the effectiveness of the forward error correction process, the forward error correction decoder 534 may also consider the values of the compensated data symbols that were used by the demodulator 524 to generate the data stream. The demodulator 524 may retain these symbol values as it converts the compensated data symbols to binary values.

In a non-interleaving embodiment of the transmitter 400 and receiver 500, the receiver 500 can begin to receive and process data as soon as the pilot word detector 516 locates the differentially encoded pilot words (for example, after 32 pilot periods 210). In non-interleaved embodiments, the receiver 500 must buffer data for a certain amount of time before the deinterleaver 534 can deinterleave the stream of digital data.

As will be recognized by those skilled in the art, the transmitter 400 and receiver 500 can advantageously be designed to use the periodic pilot word positions as reference points for sending units of data, thereby allowing the transmitter 400 and receiver 500 to communicate once the pilot words have been located (disregarding any delay caused by interleaving). For example, the transmitter 400 can be designed to place receiver address fields immediately after differentially encoded pilot words, so that receivers 500 can immediately begin to receive and decode addresses once the differentially encoded pilot words have been located.

Figure 6:
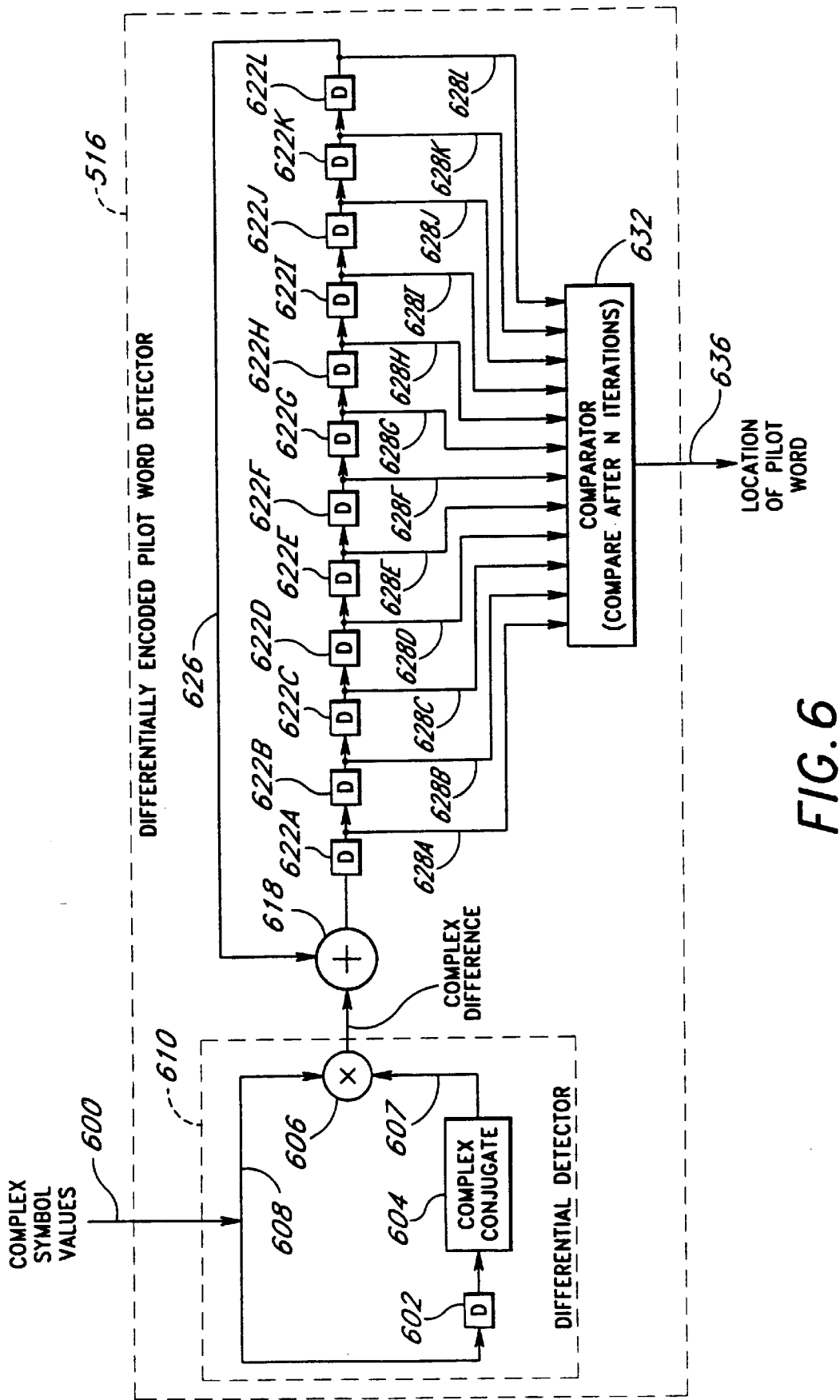
FIG. 6 is a functional block diagram of a preferred embodiment of the differentially encoded pilot word detector of FIG. 5.

FIG. 6 is a functional block diagram of a preferred embodiment of the pilot word detector 516 of FIG. 5. The pilot word detector 516 shown is in the general form of a conventional correlator or COMB filter, modified to operate on differences between consecutive symbol values (rather than operating on the symbol values themselves). The pilot word detector 516 shown in FIG. 6 is designed for use with a symbol stream that has a pilot period 210 of 12 symbols and which uses differentially encoded pilot words of two consecutively-transmitted pilot symbols. A symbol stream of this format is illustrated in FIG. 3.

The pilot word detector 516 comprises a unit delay (D) element 602, a complex conjugate generator 604, a complex multiplier 606, a complex adder 618, twelve sequentially-connected unit delay elements 622A–622L (corresponding to a pilot period of twelve symbols), and a twelve-input comparator 632. The unit delay element 602, complex conjugate generator 604, and complex multiplier 606 form a differential detector 610.

The unit delay element 602 and the complex conjugate generator 604 are provided in series along a multi-bit path 607, providing a first data path from the input 600 of the pilot word detector 516 to the complex multiplier 606. A second multi-bit path 608 is provided directly between the input 600 and the complex multiplier 606. The output of the complex multiplier 606 is provided as a first input to the complex adder 618. The output of the complex adder 618 is provided as an input to the first unit delay element 622A of the string of twelve sequentially-connected unit delay elements 622A–622L. A multi-bit feedback path 626 provides the output of the last unit delay element 622L of the string as the second input to the complex adder 618. Multi-bit paths 628A–628L provide the outputs of the respective unit delay elements 622A–622L as inputs to the twelve-input comparator 632. The output of the comparator 632 is provided on a multi-bit path 636 as the output of the pilot word detector 516.

The pilot word detector 516 shown in FIG. 6 is suitable for implementation using standard combinational and sequential logic components. However, as noted above, the pilot word detector 516 can alternatively be implemented using a DSP chip under the control of software.

The operation of the pilot word detector 516 will now be described. The differential detector 610 receives complex symbol values from the sampler 514 (FIG. 5) at a rate of one symbol value per signaling interval T. Each complex symbol value corresponds to a channel-impaired symbol that may be either a data symbol or a pilot symbol.

Every signaling interval T the differential detector 610 outputs a complex value that represents the complex difference between two consecutive symbols (i.e., the difference between two consecutive complex symbol values). Each complex difference is generated by multiplying the symbol for the current signaling interval $T_n$ with the complex conjugate of the symbol for the immediately preceding signaling interval $T_{n-1}$. The symbol for the current signaling interval $T_n$ is provided to the complex multiplier 606 along the direct path 608. The complex conjugate of the symbol from the preceding signaling interval $T_{n-1}$ is provided along the path 607, which includes the unit delay element 602 (which delays each symbol by one signaling interval T) and the complex conjugate generator 604 (which inverts the sign of the imaginary portion of each symbol). This method of calculating the difference between two complex values is known in the art, and produces a complex numerical value that represents both the phase difference and the amplitude difference between two symbols. However, alternative methods for generating a numerical representation of the difference could be used, including methods that yield only the phase difference between two symbols.

The outputs of the unit delay elements 622A–622L are reset to zero whenever the pilot word detector 516 initiates a differentially encoded pilot word detection operation. Thus, for the first twelve signaling intervals T after the pilot word detector 516 initiates pilot word detection, the feedback path 626 provides values of zero to the complex adder 618, and the complex difference values generated by the differential detector 610 are shifted sequentially through the unit delay elements 622A–622L.

With each successive iteration of twelve signaling intervals, the complex adder 618 adds the complex difference values for the current iteration with the corresponding complex difference values from the previous iterations. For example, on the second iteration, a complex difference calculated during a signaling interval $T_n$ will be added to the complex difference calculated during the signaling interval $T_{n-12}$, and a complex difference calculated during a signaling interval $T_{n+1}$ will be added to the complex difference calculated during the signaling interval $T_{n-11}$. Thus, the complex values stored by the unit delay elements 622A–622L represents cumulative summations of complex symbol differences for each of the twelve possible periodic positions where the pilot word may be found.

As described above, the complex difference between the two pilot symbols of a differentially encoded pilot word will be approximately the same each iteration, since channel effects on differences between consecutive symbols are typically negligible. Thus, the cumulative sum corresponding to the pilot word position will grow in magnitude with each successive iteration. The other eleven cumulative sums will fluctuate in magnitude with successive iterations, assuming that data symbols are not transmitted in a repetitive pattern from pilot period to pilot period. After a sufficient number N of iterations, the pilot word position can therefore be determined by comparing the magnitudes of the cumulative summation values. The comparator 632 performs this function by comparing the magnitudes of the cumulative summation values after N iterations. In the preferred embodiment, the comparator 632 performs this comparison after N=32 iterations, which has been found to produce a high probability of accurate synchronization in a mobile, cellular environment. A lower value for N will decrease the minimum synchronization time for a receiver, but will increase the probability that the comparison process will produce an erroneous synchronization result.

Once the symbol constellation for a system has been selected, the pilot symbols of pilot words are preferably selected so as to maximize the pilot difference for the particular symbol constellation. Maximizing the pilot difference tends to increase the rate at which the cumulative summation value that represents the pilot difference increases in magnitude with successive iterations, as is desirable for rapidly detecting the location of the pilot word. Illustratively for the symbol constellation shown in FIG. 1, the symbols 104 and 106 are separated by a difference of $(3+j3)(-3+j3)=(-9-9)+(9-9)j=-18$ (using the above-described method for calculating the difference). It can further be verified that no other pair of symbols in the constellation of FIG. 1 produces a difference that is greater than 18 in magnitude. Thus, the symbols 104 and 106 are an optimum pair of pilot symbols for synchronization purposes.

The comparator 632 outputs a number that indicates the position (1-12) of the cumulative summation value with the greatest magnitude. This number corresponds to the periodic position of the differentially encoded pilot word, and is used by the pilot symbol extractor 518 (FIG. 5) to extract pilot symbols of pilot words from the symbol stream. The extracted pilot symbols are then compared with their expected values (i.e., their values prior to transmission over the wireless channel) to perform channel estimation and compensation using techniques that are known in the art.

Figures 7A, 7B, 7C:
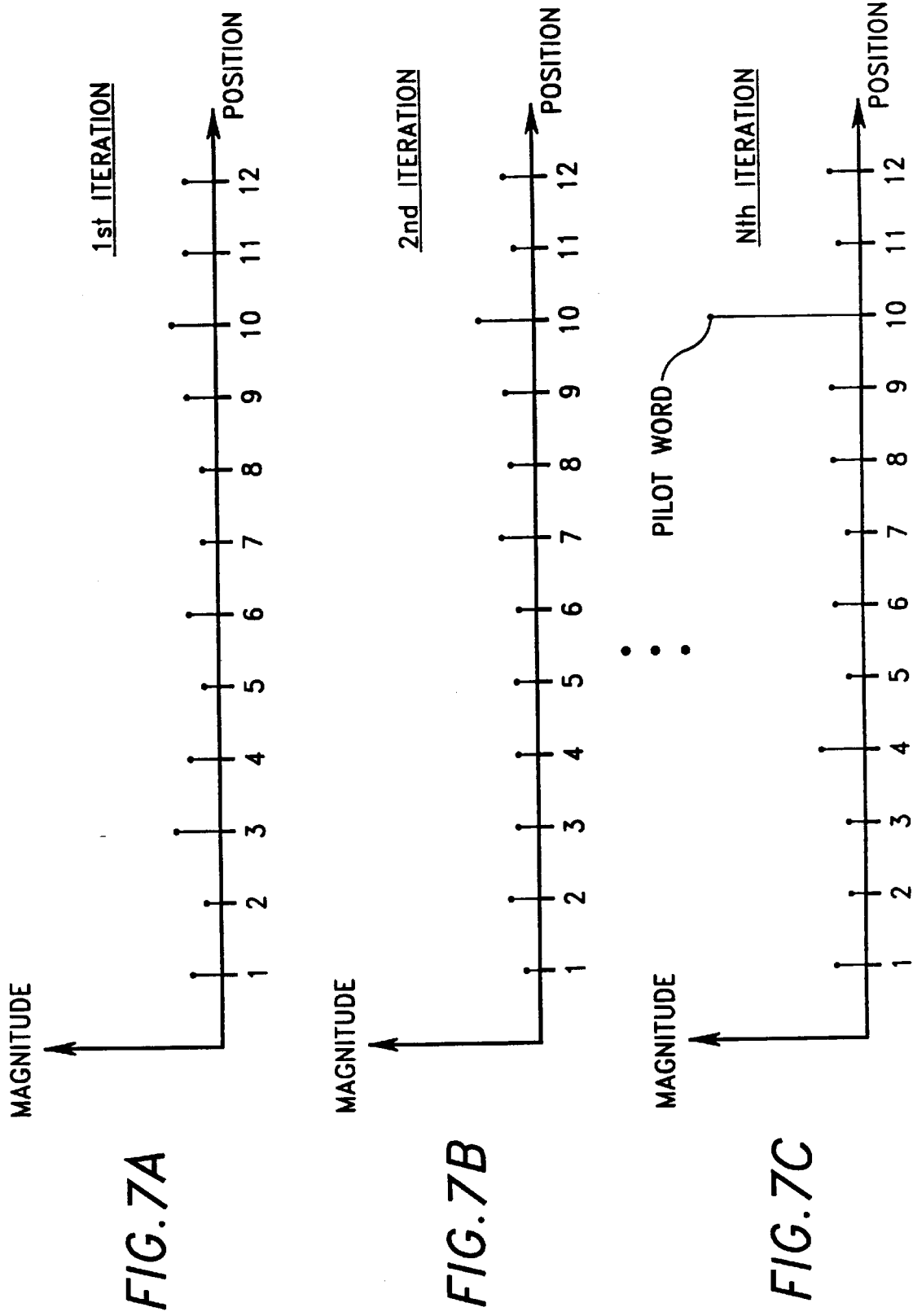
FIG. 7A is a graphical illustration of a result generated by the differentially encoded pilot word detector after a single iteration.
FIG. 7B is a graphical illustration of a result generated by the differentially encoded pilot word detector after two iterations.
FIG. 7C is a graphical illustration of a result generated by the differentially encoded pilot word detector after N iterations.

The operation of the pilot word detector 516 is further illustrated by FIGS. 7A–7C, which are graphical representations of example cumulative summation values after 1, 2, and N iterations respectively. The twelve magnitude values in each of FIGS. 7A–7C represent the magnitudes of complex values stored by the unit delay elements 622A–622L of FIG. 6.

Referring to FIG. 7A, after one iteration (i.e., twelve signaling intervals T), the twelve difference values vary in magnitude, and the position of the pilot word (position 10) cannot be reliably determined since the magnitudes of one or more other difference values are greater than or approximately equal to the magnitude of the pilot difference. Referring to FIG. 7B, the magnitude of the cumulative summation value (or cumulative difference) corresponding to position 10 begins to stand out after the second iteration as the result of the constructive addition of like pilot difference values. However, additional iterations are desirable to minimize the effects of the channel, and to differentiate between the periodic pilot differences and like differences that may coincidentally occur in the symbol stream. Referring to FIG. 7C, after N iterations (wherein N preferably equals 32) the position of the pilot word can be readily ascertained by inspection of the relative magnitudes of the twelve cumulative summation values. It is noted that the pilot word detector 516 determines the periodic pilot word position by this method without knowing the pilot difference used the transmitter 400 to encode pilot words.

To further increase reliability, the comparator 632 may include logic to detect cumulative summation values that are close in value after N iterations, to thereby detect results that have a high probability of error. Additional iterations can then be performed to ensure reliable pilot word detection.

As will be apparent to those skilled in the art, various modifications to the symbol stream format used by the system can be made without departing from the spirit of the invention. By way of example, the transmitter could be designed to transmit a differentially encoded pilot word every nth pilot period (for example, every third pilot period), and to transmit only a single pilot symbol during pilot periods for which no differentially encoded pilot word is transmitted. Such a modification to the symbol stream would desirably reduce the bandwidth occupied by pilot symbols, but would increase the average synchronization time.

While various embodiments of the system and method of the present invention have been described, it should be understood that these embodiments have been presented by way of example only, and are not intended to limit the scope of the present invention. Thus, the breadth and scope of the present invention should be defined only in accordance with the following claims and their equivalents.

What is claimed is:

1. A method of estimating the state of a wireless channel when a signal is transmitted from a transmitter to a receiver, the method comprising the steps of:

(a) periodically inserting a pilot word into a stream of data symbols, the pilot word comprising at least two pilot symbols that are separated by a fixed, predetermined pilot difference, at least one pilot symbol having a value that is known to the receiver;

(b) transmitting a stream of symbols resulting from step (a) from the transmitter on the wireless channel;

(c) receiving a stream of channel-impaired symbols at the receiver, the stream of channel-impaired symbols being the stream of symbols transmitted in step (b) as modified by the wireless channel;

(d) detecting the periodic position of the pilot word inserted in step (a) within the stream of channel-impaired symbols received in step (c) by monitoring a difference between received channel-impaired symbols;

(e) extracting said pilot word inserted in step (a) from the stream of channel-impaired symbols received in step (c) using the periodic position detected in step (d); and (f) comparing at least one pilot symbol of the pilot word extracted in step (e) with the value of the pilot symbol upon insertion in step (a) to thereby estimate the state of the channel.

2. The method according to claim 1, wherein step (d) comprises the step of monitoring the difference between received channel-impaired symbols over a plurality of pilot periods to detect a periodic occurrence of the predetermined pilot difference, the periodic occurrence of the predetermined pilot difference indicating the periodic position of the pilot word.

3. The method according to claim 1, wherein the pilot word periodically inserted in step (a) consists of two pilot symbols that are separated by a predetermined phase difference.

4. The method according to claim 1, wherein the pilot word consists of two pilot symbols that are separated by a predetermined phase difference and a predetermined amplitude difference.

5. The method according to claim 1, wherein the pilot word consists of first, second and third pilot symbols, and wherein said first and second pilot symbols are separated by a first predetermined difference and said second and third pilot symbols are separated by a second predetermined difference.

6. The method according to claim 1, further comprising the step of:
(g) using an estimate generated in step (f) to compensate the amplitude and phase of channel-impaired data symbol.

7. A transmitter for transmitting data over a wireless channel, comprising:
a constellation mapper that receives a data stream and generates a data symbol stream by transforming binary values of said data stream into corresponding symbols;
a pilot word generator that generates differentially encoded pilot words, each differentially encoded pilot word comprising at least two pilot symbols;
a pilot word inserter that periodically inserts said pilot symbols of said pilot words into said data symbol stream to produce a composite symbol stream;
a filter for filtering said composite symbol stream; and
a radio frequency up-converter that generates a radio frequency representation of said composite symbol stream for transmission over the wireless channel.

8. The transmitter according to claim 7, wherein said pilot word generator generates differentially encoded pilot words by generating two pilot symbols that are a predetermined, fixed difference apart.

9. A transmitter for transmitting data over a wireless channel, comprising:
a constellation mapper that receives a data stream and generates a symbol stream by transforming binary values of said data stream into corresponding symbols;
an inserter that periodically inserts predetermined binary values into said data stream to cause said constellation mapper to generate pilot symbols;
a pilot word generator that generates the predetermined binary values that are inserted by the inserter, the predetermined binary values generated so as to produce periodic, differentially encoded pilot words in said symbol stream;
a filter for filtering said symbol stream; and
a radio frequency up-converter that generates a radio frequency representation of said symbol stream for transmission over the wireless channel.

10. The transmitter according to claim 9, wherein each differentially encoded pilot word consists of two pilot symbols that are separated by a fixed difference.

11. A receiver for receiving a stream of symbols transmitted over a wireless channel, the stream of symbols comprising data symbols and comprising pilot symbols that are arranged as differentially encoded pilot words, each differentially encoded pilot word comprising at least two pilot symbols that are separated by a fixed difference, the differentially encoded pilot words being spaced apart in the symbol stream by a pilot period, the receiver comprising:
an antenna that receives the stream of symbols as a radio frequency signal;
a down-converter that transforms the radio-frequency signal into a baseband signal;
a filter that bandlimits the baseband signal;
a sampler that samples the baseband signal to generate a stream of symbol values;
a detector that detects the periodic position of the differentially encoded pilot words within the stream of symbols by monitoring differences between symbol values of said stream of symbol values over multiple pilot periods;

a pilot symbol extractor that extracts the differentially encoded pilot words from the stream of symbols by extracting pilot symbol values from said stream of symbol values;
a channel estimator that compares pilot symbol values extracted by said pilot symbol extractor with transmitted pilot symbol values to generate channel estimates;
a channel compensator that compensates data symbols in the stream of symbols by using said channel estimates to adjust data symbol values in said stream of symbol values, the channel compensator thereby producing a stream of compensated data symbols; and
a demodulator that converts said stream of compensated data symbols to a stream of digital data by converting compensated data symbols into corresponding binary data values.

12. The receiver according to claim 11, wherein said detector generates cumulative summation value over multiple pilot periods with one cumulative summation value generated for each possible periodic position within the stream of symbols where the differentially encoded pilot words may be located, each cumulative summation value representing a cumulative symbol difference for two symbol positions.

13. A transmitter that transmits a sequential stream of data, the sequential stream of data comprising:
a stream of data symbols; and
a series of pilot words where each word comprises two differentially encoded symbols spaced at substantially equal time intervals within said stream of data symbols, at least some of said pilot words being identical to each other.

14. The transmitter according to claim 13, wherein all pilot words are identical.

15. The transmitter according to claim 13, wherein every other pilot word is identical.

16. The transmitter according to claim 13, wherein the differential encoding comprises a fixed difference between the pilot word symbols.

17. The transmitter according to claim 16, wherein the fixed difference is a difference in amplitude.

18. The transmitter according to claim 16, wherein the fixed difference is a difference in phase.

19. The transmitter according to claim 13, in combination with a receiver that is designed to receive the sequential stream of data.

20. The transmitter according to claim 13, wherein said transmitter transmits the sequential stream of data as a radio frequency signal on a wireless channel.

21. A sequential stream of data, the sequential stream of data comprising:
a stream of data symbols; and
a series of pilot words that comprise two differentially encoded symbols spaced at substantially equal time intervals within said stream of data symbols, at least some of said pilot words being identical to each other.

22. The sequential stream of data according to claim 21, wherein all of said pilot words are identical.

23. The sequential stream of data according to claim 21, wherein every other pilot word is identical.

24. The sequential stream of data according to claim 21, wherein said two differentially encoded symbols differ from one another by a fixed phase.

25. The sequential stream of data according to claim 21, in combination with a receiver configured to receive the sequential stream of data.

* * * * *